(12) United States Patent
Venugopalan et al.

(10) Patent No.: US 12,461,679 B2
(45) Date of Patent: Nov. 4, 2025

(54) SYSTEMS AND METHODS FOR PROVIDING ASYNCHRONOUS READ/WRITE SUPPORT IN DDR CONTROLLERS

(71) Applicant: Samsung Electronics Co., Ltd., Suwon-si (KR)

(72) Inventors: Hari Krishnan Thiruvalli Venugopalan, Bengaluru (IN); Karthik Srinivasan, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/655,716

(22) Filed: May 6, 2024

(65) Prior Publication Data

US 2025/0028477 A1    Jan. 23, 2025

(30) Foreign Application Priority Data

Jul. 19, 2023    (IN) .............................. 202341048736

(51) Int. Cl.
*G06F 3/06*    (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0655; G06F 3/0604; G06F 3/0673
See application file for complete search history.

(56) References Cited

U.S. PATENT DOCUMENTS

| | | | |
|---|---|---|---|
| 6,810,468 B2 | 10/2004 | Miyamoto et al. | |
| 7,286,441 B1 | 10/2007 | White et al. | |
| 7,461,239 B2 | 12/2008 | Abernathy et al. | |
| 8,572,322 B2 | 10/2013 | Xu et al. | |
| 9,070,430 B2 | 6/2015 | Lin | |
| 9,117,511 B2 | 8/2015 | Sadowski | |
| 9,442,861 B2 | 9/2016 | McCormick, Jr. | |

(Continued)

FOREIGN PATENT DOCUMENTS

CN    106445836 A    2/2017

OTHER PUBLICATIONS

M. Grannaes et al. 'Low-cost open-page prefetch scheduling in chip multiprocessors' IEEE International Conference on Computer Design, 2008, 978-1-4244-2658, pp. 390-396.

(Continued)

*Primary Examiner* — Jane W Benner
(74) *Attorney, Agent, or Firm* — Harness, Dickey & Pierce, P.L.C.

(57) ABSTRACT

A system and method for implementing asynchronous READ/WRITE operations in a Double Data Rate (DDR) controller to reduce Dynamic Random Access Memory (DRAM) access latency. The system provides a program configurable interface to the DDR controller for pre-fetching data from a memory address of interest into cache, for serving an asynchronous READ operation. The asynchronous READ operation minimizes or reduces pre-charge latency, Row Address Select (RAS) latency, and Column Address Select (CAS) latency. The system provides a program configurable interface to the DDR controller the read operation or the write operation being for providing buffer data directly to the DDR controller to handle an asynchronous WRITE operation.

17 Claims, 11 Drawing Sheets

(56) References Cited

U.S. PATENT DOCUMENTS

| | | |
|---|---|---|
| 10,157,139 B2 | 12/2018 | Turner |
| 2013/0002315 A1 | 1/2013 | Boucard |
| 2017/0357604 A1* | 12/2017 | Lim .................. G06F 13/1689 |
| 2024/0361931 A1* | 10/2024 | Lepaksha .............. G06F 3/0685 |

OTHER PUBLICATIONS

D. Chen, 'Reducing Latency, Power, and Gate Count with the Tensilica Floating-Point FMA' Cadence, Computer Science, 2017, pp. 1-4.

H. Pakosh 'Reducing Power Consumption while increasing SoC Performance' Tech Talk latest technological advances in silicon IP, 2014, pp. 1-5.

M. Hillenbrand 'Physical Address Decoding in Intel Xeon v3/v4 CPUs: A Supplemental Datasheet' Karlsruhe Institute of Technology, 2017, pp. 1-21.

'Optimizing Memory Copy Routines' AN12628, NXP Semiconductors, Rev. 0, 2019, pp. 1-18.

I. Hur et al. 'Memory Scheduling for Modern Microprocessors' ACM Transactions on Computer Systems, vol. 25, No. 4, Article 10, 2007, pp. 10:1-10:36.

K. Nathella et al. 'Making Temporal Prefetchers Practical: The MISB Prefetcher', 2019, pp. 1-12.

H. Hassan. 'Reducing DRAM Access Latency by Exploiting DRAM Leakage Characteristics and Common Access Patterns' Tobb University of Economics and Technology Institute of Natural and Applied Sciences, Department of Computer Engineering, 2016, pp. 1-62.

S.Gandhi. 'AXI address to DRAM addressing' Solutions (<https://www.amd.com/en/corporate/xilinx-acquisition>), 2020, pp. 1-2.

M. Seaborn 'How physical addresses map to rows and banks in Dram' Lacking Rhoticity 2015, pp. 1-4.

* cited by examiner

SYSTEMS AND METHODS FOR PROVIDING ASYNCHRONOUS READ/WRITE SUPPORT IN DDR CONTROLLERS

CROSS-REFERENCE TO RELATED APPLICATION

This application is based on and claims priority under 35 U.S.C. § 119 to Indian patent application Ser. No. 202341048736, filed on Jul. 19, 2023, the disclosure of which is incorporated by reference herein in its entirety

TECHNICAL FIELD

Example embodiments disclosed herein relate to external memory controllers, and more particularly to implementing asynchronous READ/WRITE operations in a Double Data Rate (DDR) controller to reduce Dynamic Random Access Memory (DRAM) access latency.

BACKGROUND

Typically, a base hardware platform includes a central processing unit (CPU), a main system memory, one or more input/output (I/O) devices, and one or more storage devices. The main system memory is generally composed of one or more memory devices (such as a double data rate (DDR) dynamic random access memory (DRAM)), which is connected to one or more memory controllers and/or processors. The CPU can process MULTIPLE READ, WRITE, and configuration requests from a system controller through a cache. Caches are high speed memory arrays which can store instructions or data that are required or used by the processor or an execution unit within the processor.

In WRITE operations, when filling series of memory location with zero or fixed patter, a Level 2 (L2) or Level 3 cache (which is filled with previous data of processes/applications/data) can be disturbed or drained out for accessing new data. This results in inefficiencies when handling applications such as, image processing, deep learning, machine learning and file-system based applications. In some cases, during WRITE operations for filling with fixed pattern or zeroes, a READ instruction can be issued prior to the WRITE instructions, thus disturbing the L2 cache content by reading data, then overwriting with zero or pattern and write back, which may anyway reset to zeros. Thus, during write with zero of fixed pattern, several reads may be involved, and since anyway full block of memory be it 4 KB or 16 KB will be set to zero, reading them and overwriting with zero and writing back results in unnecessary READ being issued.

The READ operation is a time consuming process. In a READ operation, a bank and a row of the DRAM is first selected for activation. The commands which need to be sequentially issued to the DRAM bank in order to access data are a pre-charge command, a row-activation command, and a READ/WRITE command. The pre-charge command is used to pre-charge row bitlines. The activate command is used to open a row in the row buffer with a row address using a Row Address Select (RAS). The READ/WRITE command is used to access the row buffer with the column address using the RAS. After accessing the required or used row, the DRAM controller can either keep the row open in the row buffer (open-row policy) or close the row buffer with a pre-charge command (closed-row policy) using a Column Address Select (CAS). However, only 30% of time of the total READ time is spent in actual READ, whereas the remaining 70% of time lost in preparation i.e., due to pre-charge, RAS, and CAS latency before actual access.

SUMMARY

Example embodiments disclosed herein include systems and methods with an asynchronous READ/WRITE support in a double data rate (DDR) controller for reduced memory access latency.

Some example embodiments herein provide a method for supporting software (or computing device) controlled asynchronous READ/WRITE operations in a Double Data Rate (DDR) controller. The method includes invoking, by a computing device, one of an async memget function for performing an asynchronous READ operation and an async memset function for performing an asynchronous WRITE operation. The method includes transmitting, by the computing device, one of an async-READ data command and an async-WRITE data command for the invoked async memget function and the async memset function to the DDR controller. The computing device proceeds with other operations in an unblocked independent manner after transmitting one of the async-READ data command and the async-WRITE data command to the DDR controller for implementing one of the async memget function and the async memset function respectively. The method includes triggering, by the DDR controller, one of a read operation and a write operation after receiving one of the async-READ data command and the async-WRITE data command from the computing device, the read operation or the write operation being for generating a memory access request to access a Dynamic Random Access Memory (DRAM).

Some example embodiments herein provide a system for supporting asynchronous READ/WRITE operations in a DDR controller. The system comprises a READ module and a WRITE module of a computing device and a DDR trigger module of the DDR controller. The READ module can be configured to invoke an async memget function and transmit an async-READ data command for the invoked async memget function to the DDR controller, the async memset function being for performing an asynchronous READ operation. The WRITE module can be configured to invoke an async memset function and transmit an async-WRITE data command for the invoked async memset function to the DDR controller for performing an asynchronous WRITE operation. The computing device proceeds with other operations in an unblocked independent manner after triggering the DDR controller, the one of the async-READ data command and the async-WRITE data command being for implementing one of the async memget function and the async memset function respectively. The DDR trigger module of the DDR controller can be configured to trigger one of a read operation or a write operation after receiving one of the async-READ data command or the async-WRITE data command from the READ module and the WRITE module of the computing device respectively.

Some example embodiments herein provide a computing device comprising a processor. The processor can be configured to invoke one of an async memget function for performing an asynchronous READ operation and an async memset function for performing an asynchronous WRITE operation. The processor can also be configured to transmit one of an async-READ data command and an async-WRITE data command for the invoked async memget function and the async memset function to a Double Data Rate (DDR) controller. The processor can proceed with other operations in an unblocked independent manner after transmitting one of the async-READ data command and the async-WRITE data command to the DDR controller, the one of the read operation and the write operation being for implementing one of the async memget function and the async memset function respectively. The DDR controller can be configured to trigger one of a read operation and a write operation after receiving one of the async-READ data command and the async-WRITE data command from the processor, for generating a memory access request to access the DRAM.

These and other aspects of the example embodiments herein will be better appreciated and understood when considered in conjunction with the following description and the accompanying drawings. It should be understood, however, that the following descriptions, while indicating at least one example embodiment and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Example embodiments herein are illustrated in the accompanying drawings, throughout which like reference letters indicate corresponding parts in the various figures. The example embodiments herein will be better understood from the following description with reference to the drawings, in which.

DETAILED DESCRIPTION

Figure 1:
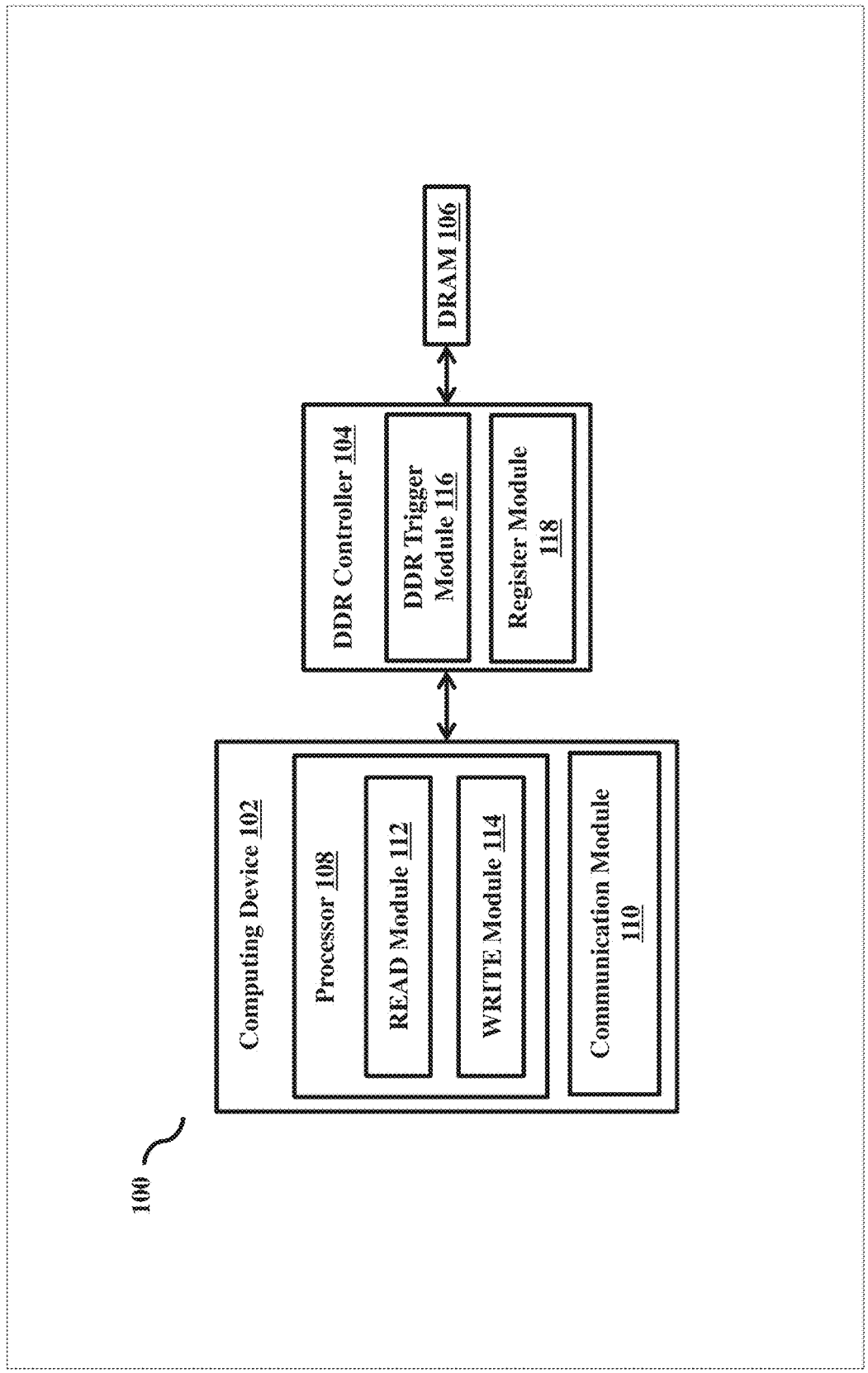
FIG. 1 depicts a system for supporting asynchronous READ/WRITE operations in a DDR controller for reducing Dynamic Random Access Memory (DRAM) access latency, according to some example embodiments as disclosed herein.

The example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The examples used herein are intended merely to facilitate an understanding of ways in which the example embodiments herein may be practiced and to further enable those of skill in the art to practice the example embodiments herein. Accordingly, the examples should not be construed as limiting the scope of the example embodiments herein.

Some example embodiments herein achieve reduced memory access latency by an asynchronous READ/WRITE support in a double data rate (DDR) controller. Referring now to the drawings, and more particularly to FIGS. 1 through 11, where similar reference characters denote corresponding features consistently throughout the figures, there are shown example embodiments.

FIG. 1 depicts a system 100 for supporting asynchronous READ/WRITE operations in a DDR controller 104 for reducing Dynamic Random Access Memory (DRAM) 106 access latency. The system 100 comprises a computing device 102 in communication with the DDR controller 104. The DDR controller 104 is in communication with the DRAM 106 for reading and writing data. Examples of the computing device 102 can be User Equipment (UE) such as a mobile phone, a smart phone, computers, tablets, wearable devices, and other electronic devices, which are capable of accessing the DRAM 106 for reading and writing data.

In an example embodiment herein, the computing device 102 comprises a processor 108 and a communication module 110. The processor 108 can invoke one of an async memget function for performing an asynchronous READ operation and an async memset function for performing an asynchronous WRITE operation. The async memget function and the async memset function are invoked for the requests received from at least one Application Programming Interface (API) of the computing device 102. The processor 108 can trigger the DDR controller 104 to access the DRAM 106 for performing the READ operation and the WRITE operation respectively based on the invoked async memget function and the async memset function. The processor 108 can intimate the DDR controller 104 with a specific physical address of the DRAM 106 to fill with a predefined (or alternatively, desired) pattern or to pre-fetch the data in a Level 2 (L2) or Level 3 (L3) cache. This can free up the processor cycles.

The processor 108 comprises a READ module 112 and a WRITE module 114.

In an example embodiment herein, the READ module 112 can invoke an async memget function and transmit an async-READ data command for the invoked async memget function to the DDR controller 104 for performing an asynchronous READ operation. The async memget function can be an asynchronous READ request. The READ module 112 can invoke the async memget function based on a READ requirement request received from at least one API running in the computing device 102. In an example embodiment herein, the READ module 112 can invoke the async memget function and also alternatively it can write to a configuration register in the DDR controller 104 for the invoked async memget function for performing the asynchronous READ operation. In an example embodiment herein, the async memget function is configured to generate async-READ data command to the DDR controller 104. In an example embodiment herein, the async memget function is also alternatively configured to write to the configuration register in the DDR controller 104 for obtaining data from a specified memory location and size.

In an example embodiment herein, the WRITE module 114 can invoke an async memset function and transmit an async-WRITE data command for the invoked async memset function to the DDR controller 104 for performing an asynchronous write operation. The async memset function can be an asynchronous WRITE request. The WRITE module 114 can invoke the async memset function based on a WRITE requirement request received from at least one API running in the computing device 102. In an example embodiment herein, the WRITE module 114 can invoke the async memset function and write to a configuration register in the DDR controller 104 for the invoked async memset function for performing the asynchronous WRITE operation. In an example embodiment herein, the async memset function is configured to generate async-WRITE data command to the DDR controller 104. In an example embodiment herein, the async memset function also alternatively it can write to the configuration register in the DDR controller 104 for writing data of a specific pattern in a specified memory location and size. For asynchronous read, the configuration register specifies a specific address to READ the data so that the DDR controller 104 reads from the specified address and WRITE to destination address mentioned as part of the configuration register in the DDR controller 104 for asynchronous write.

In an example embodiment herein, the configuration register can be configured, by the async memget function and the async memset function, with, but not limited to, a list of physical address such as a memory location, size in units such as pre-configurable bulk data size, a WRITE pattern or a READ address of a memory location, and a plurality of status flags and so on.

In an example embodiment herein, the computing device 102 can proceed with other operations in an unblocked independent manner after transmitting one of the async-READ data command and the async-WRITE data command to the DDR controller 104 for implementing one of the async memget function and the async memset function respectively. In an example embodiment herein, the computing device 102 can proceed with other operations in the unblocked independent manner after writing to the configuration register in the DDR controller 104 for implementing one of the async memget function and the async memset function respectively.

In an example embodiment herein, the async memset function with a memory address is programmed to the configuration register in the DDR controller 104 for implementing an asynchronous copy operation. The asynchronous copy operation is a combination of the asynchronous READ operation and the asynchronous WRITE operation. The asynchronous copy operation uses an asynchronous WRITE operation with source address of memory content provided along with destination memory address.

In an example embodiment herein, the DDR controller 104 comprises a DDR trigger module 116 and a register module 118. The DDR trigger module 116 can receive one of the async-READ data command and the async-WRITE data command from the READ module 112 and the WRITE module 114 of the computing device 102. The DDR trigger module 116 can trigger one of a read operation and a write operation, thereby generating a memory access request to access the DRAM 106, after receiving one of the async-READ data command and the async-WRITE data command. In an example embodiment herein, the DDR trigger module 116 can receive the configuration register for one of the async memget function and the async memset function, from the READ module 112 and the WRITE module 114 of the computing device 102. The DDR trigger module 116 can trigger one of the read operation and the write operation, thereby generating the memory access request to access the DRAM 106. The DDR trigger module 116 can trigger one of the read operation and the write operation after writing to the configuration register in the DDR controller 104 by the READ module 112 and the WRITE module 114 of the computing device 102.

In an example embodiment herein, the register module 118 can store data of data commands such as async-READ data commands and async-WRITE data commands, and the configuration registers.

Each memory access request can include, but not limited to, an address register to pre-fetch data, a pattern to be filled, required or used size, along with control and status register to signify the operation complete status. The generated memory access request is placed in a queue in the end or head of list and/or sorted in bank wise access, by the DDR controller 104, for accessing the DRAM 106 to maintain integrity of the data in the DRAM 106. The DDR controller 104 can place the memory access request in an internal request queue once the DDR controller 104 is programmed with the physical address, size, pattern etc.

The DDR controller 104 requires or uses a command (such as READ/WRITE) along with a physical address and translates the physical address to actual row-column mappings based on how the initial configuration. For example, a typical 32/64 bit physical address is translated into several bits of rank, bank group, bank, row, column etc. The async-READ data commands and the async-WRITE data commands are vendor or custom commands which can be sent to the DDR controller 104, through a packet command format of tag-length-value format can be sent. These vendor specific commands can be a part of regular commands. Further, a configuration logic can be programmed in the DDR controller 104 for processing pre-fetch/deferred WRITE requests. The configuration logic gets triggered based on the DDR register writes.

In an example embodiment herein, the DRAM 106 can receive a single command with a specific physical address for each asynchronous operation from the memory access request sent by the DDR controller 104. The DRAM 106 can enable the DDR controller 104 to WRITE the specific physical address with zeros in burst mode by opening a page row-wise. The DRAM controller 104 can use the burst mode write or prefill with pattern JEDEC-command or any DRAM standard commands which may be added in future. Or the DRAM controller 104 can use normal DRAM-specific standard memory write commands in cyclic manner to fill with zeroes or any specific pattern. The DRAM 106 can enable the DDR controller 104 to READ the data from a specific physical address by opening a page row-wise and pre-fetching or early-reading the data in a cache from where the processor 108 can access the pre-fetched data. To achieve this, the DRAM controller 104 can use the burst mode read JEDEC-command or any DRAM standard commands which may be added in future. Thus, to use any future JEDEC Burst-read-write commands, the async-READ and async-WRITE command serve as interface to software. A typical DRAM 106 chip requires or uses only rank, bank, Row Address Select (RAS), and Column Address Select (CAS) signals based on which right data from the bank row can be fetched and activated and the column data are pulled into sense amplifiers.

In an example embodiment herein, the processor 108 can process and execute data of a plurality of modules of the computing device 102. The processor 108 may implement the plurality of modules and perform the functions described with relation to the modules. Or restated, the plurality of modules may be implemented by the processor 108. The processor 108 may comprise one or more of microprocessors, circuits, and other hardware configured for processing. The processor 108 can be at least one of a single processor, a plurality of processors, multiple homogeneous or heterogeneous cores, multiple Central Processing Units (CPUs) of different kinds, microcontrollers, special media, and other accelerators. The processor 108 may be an application processor (AP), a graphics-only processing unit such as a graphics processing unit (GPU), a visual processing unit (VPU), and/or an Artificial Intelligence (AI)-dedicated processor such as a neural processing unit (NPU).

In an example embodiment herein, the plurality of modules of the processor 108 can communicate with the DDR controller 104 via the communication module 110. The communication module 110, through which the modules of the processor 108 and the DDR controller 104 communicate, may be in the form of either a wired network or a wireless communication network. The wireless communication network may comprise, but not limited to, GPS, GSM, Wi-Fi, Bluetooth low energy, NFC, and so on. The wireless communication may further comprise one or more of Bluetooth, ZigBee, a short-range wireless communication such as UWB, and a medium-range wireless communication such as Wi-Fi or a long-range wireless communication such as 3G/4G/5G/6G and non-3GPP technologies or WiMAX, according to the usage environment.

FIG. 1 shows example modules of the computing device 102 and the DDR controller 104, but it is to be understood that other example embodiments are not limited thereon. In other example embodiments, the computing device 102 and the DDR controller 104 may include less or more number of modules. Further, the labels or names of the modules are used for illustrative purpose and does not limit the scope of the invention. One or more modules can be combined together to perform the same or substantially similar function in the computing device 102 and the DDR controller 104.

Figure 2:
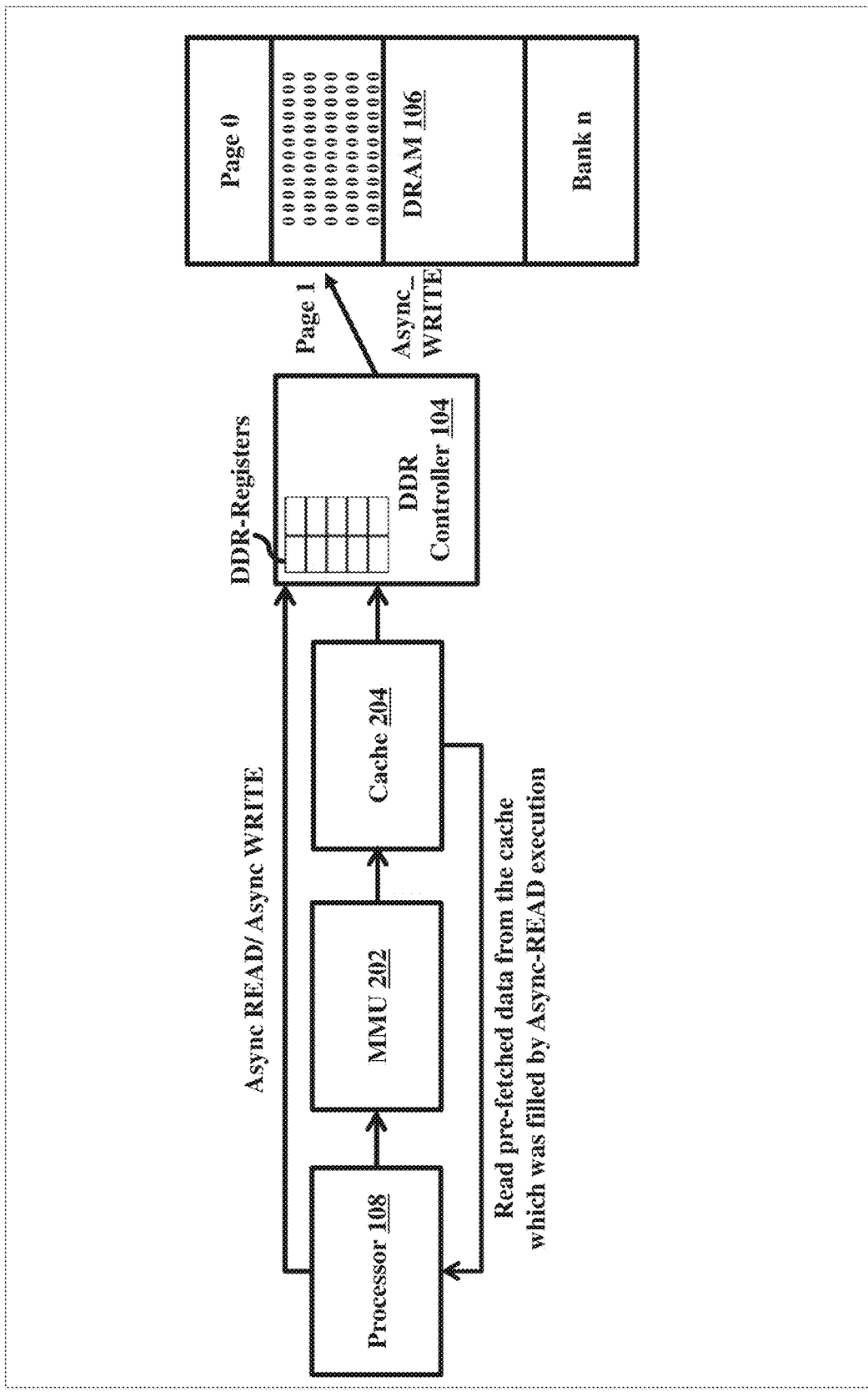
FIG. 2 depicts a detailed block representation of the system for implementing asynchronous READ/WRITE operations, according to some example embodiments as disclosed herein.

FIG. 2 depicts a detailed block representation of the system 100 for implementing asynchronous READ/WRITE operations. The processor 108 transmits at least one of the async-READ data command and the async-WRITE data command directly to the DDR controller 104 or writes to the configuration register in the DDR controller 104 for one of the async memget function and the async memset function. The DDR controller 104 generates required or used memory access requests, after receiving one of the async-READ data command and the async-WRITE data command or the configuration register. The DDR controller 104 stores data of the data commands and the configuration registers in DDR-registers of the register module 118. The DDR controller 104 performs a plurality of READ operations and a plurality of WRITE operations in a queue by accessing the DRAM 106 through the generated memory access requests.

For example, the DRAM 106 can enable the DDR controller 104 to WRITE a specific physical address with zeros in burst mode, after receiving a memory access request for an asynchronous WRITE operation with the specific physical address. The WRITE operation is performed by the DDR controller 104 by opening a page row-wise (i.e., one by one) and filling one-shot one-row with zeros without having to open again, hereby handling the open-page and close-page policies of the page more effectively.

For example, the DRAM 106 can be enabled by the DDR controller 104 to READ data from a specific physical address, after receiving a memory access request for an asynchronous READ operation with the specific physical address. The READ operation is performed by the DDR controller 104 by opening a page row-wise and pre-fetching or early-reading the data in a cache 204, for example L2 or L3 cache. The processor 108 can access the pre-fetched data from the cache 204. This can avoid a READ cycle of 4 KB for 1 page. Thus, the processor 108 can work independently without having to wait for the DDR controller 104 to complete the WRITE/READ and the overall performance is faster.

A Memory Management Unit (MMU) 202 connected in between the processor 108 and the cache 204 can manage address operations in the computing systems. The MMU 202 can handle virtual addressing and can control physical memory access by the processor 108 when required or used. The MMU 202 can further access the DRAM 106 in order to provide separation and protection of address spaces.

Figure 3:
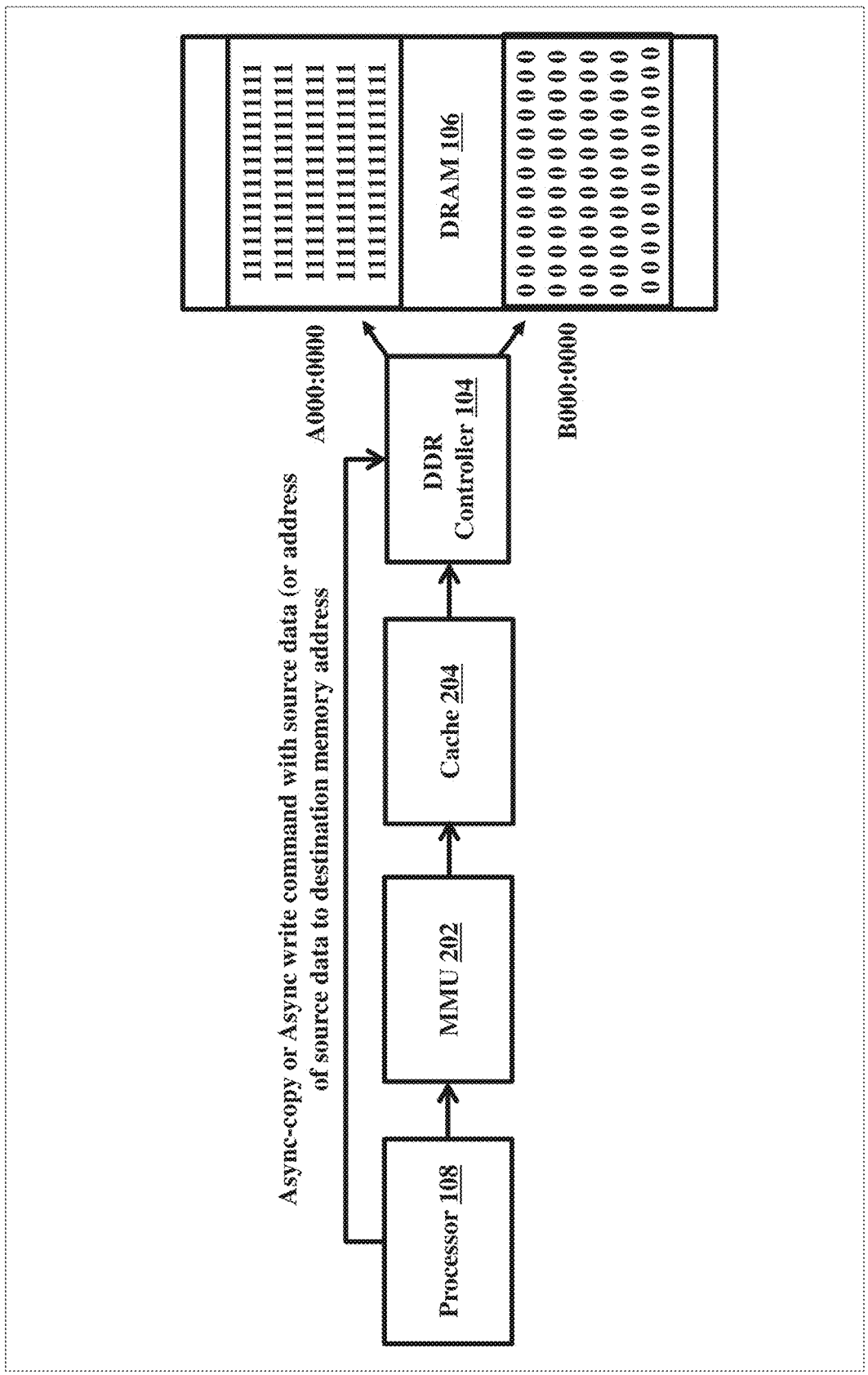
FIG. 3 depicts a detailed block representation of the system for implementing asynchronous COPY operation, according to some example embodiments as disclosed herein.

FIG. 3 depicts a detailed block representation of the system 100 for implementing an asynchronous COPY operation. The processor 108 transmits an async-WRITE data command directly to the DDR controller 104 or writes to a configuration register in the DDR controller 104 with a memory address for an async memset function for performing the asynchronous COPY operation (which is a combination of the asynchronous READ operation and the asynchronous WRITE operation). The DDR controller 104 generates required memory access request for the async memset function. The DDR controller 104 stores data of the async memset functions in DDR-registers of the register module 118. The DDR controller 104 performs a plurality of COPY operations in a queue by accessing the DRAM 106 through the generated memory access requests. Thus, the DDR controller 104 is provided with source, destination address etc. of memory data through the data commands or configuration registers, and the DDR controller 104 uses its own internal-cache as intermediate storage and performs the asynchronous copy operation without involving the processor 108. This can save the processor cycles and unnecessary L2 cache population.

Figure 4:
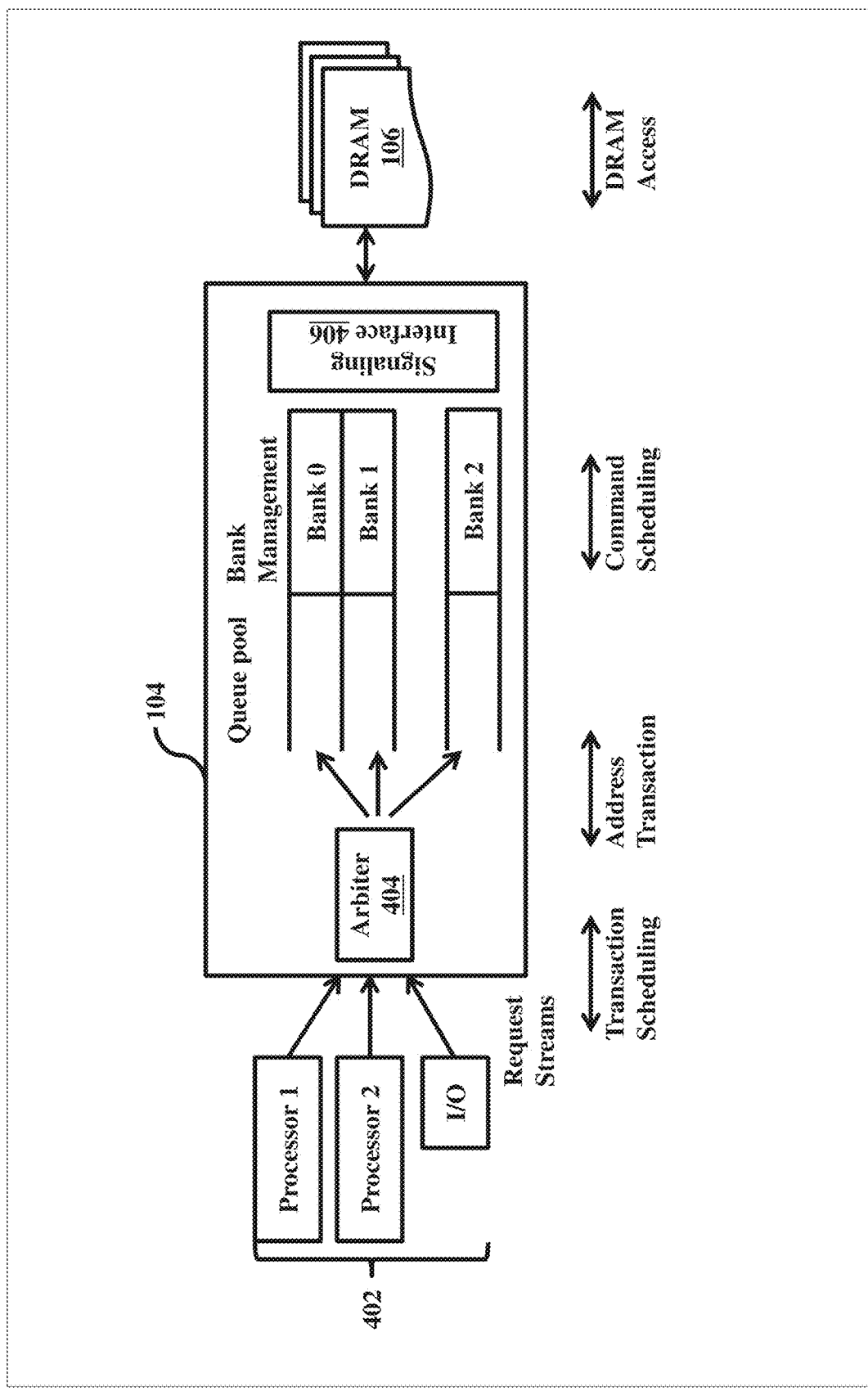
FIG. 4 depicts an internal data flow diagram of the DDR-controller, according to some example embodiments as disclosed herein.

FIG. 4 depicts an internal data flow diagram of the DDR controller 104. The DDR controller 104 receives plurality of data commands or configuration registers from multiple sources 402 such as processor 1, processor 2 and other I/O sources which is a transaction scheduling. The DDR controller 104 comprises an arbiter 404 to divide the requests for address transaction and insert the requests in a queue pool. The asynchronous READ and WRITE requests are queued as normal READ and WRITE requests in the queue on First Come First Serve (FCFS) basis in the queue pool and sorted in bank wise access such as bank 0, bank 1, bank 2 . . . , bank n and so on for command scheduling. The sorted requests are transmitted to a plurality of DRAM 106 via signaling interface 406 for DRAM access.

Table 1 below shows a list of the DDR controller 104 configuration registers in which a top portion of the table shows the commonly used configuration registers for DDR controller 104 to be enabled/configured such as RAS, CAS settings, timing, clock configuration etc.

TABLE 1

Existing Registers

DDR-registers related to
Initialization
RAS, CAS Settings
Clock, self-refresh settings, auto-precharge settings (global/locally by chip-select)
Error control, power management
PHY registers for link initialization and training

| Newly added registers | | | |
| --- | --- | --- | --- |
| List of Physical address | Value or Pointer to Source location | Size | Status Flags |
| Physical address 1 equivalent of the virtual address | Value = 0, 0, 0xAA, 0x55 Pointer to source location | Preferably page-wise set in multiples of 4 KB i.e., 3 means (12 KB), 4 (16 KB), 8 (64 KB) | Start/Trigger (set by CPU) Source flag type - value or address? Completed (set by DDR) |
| ... | ... | ... | ... |
| ... | | ... | ... |

A new set of registers can be added, which has a list of the physical address along with size for which pre-fetch for performing async-READ (or preset to specific pattern) needs to be done for performing async-WRITE. The DDR controller 104 comprises control and status flags for each internal access request which indicates the trigger of memory access (such as for async-read/async-write) followed by status flags (status of async-read/async-write complete). For example, for an async-READ, the processor 108 can write the address, size, and trigger the READING. For example, for an async-WRITE, the processor 108 can write the address, size, pattern to the set for WRITING. The DDR controller 104 usually gets triggered for refresh cycles and memory access requests where the memory access requests can be served per-bank wise. After de-queuing the request, the DDR controller 104 serves the request for READ/WRITE operations.

Figure 5:
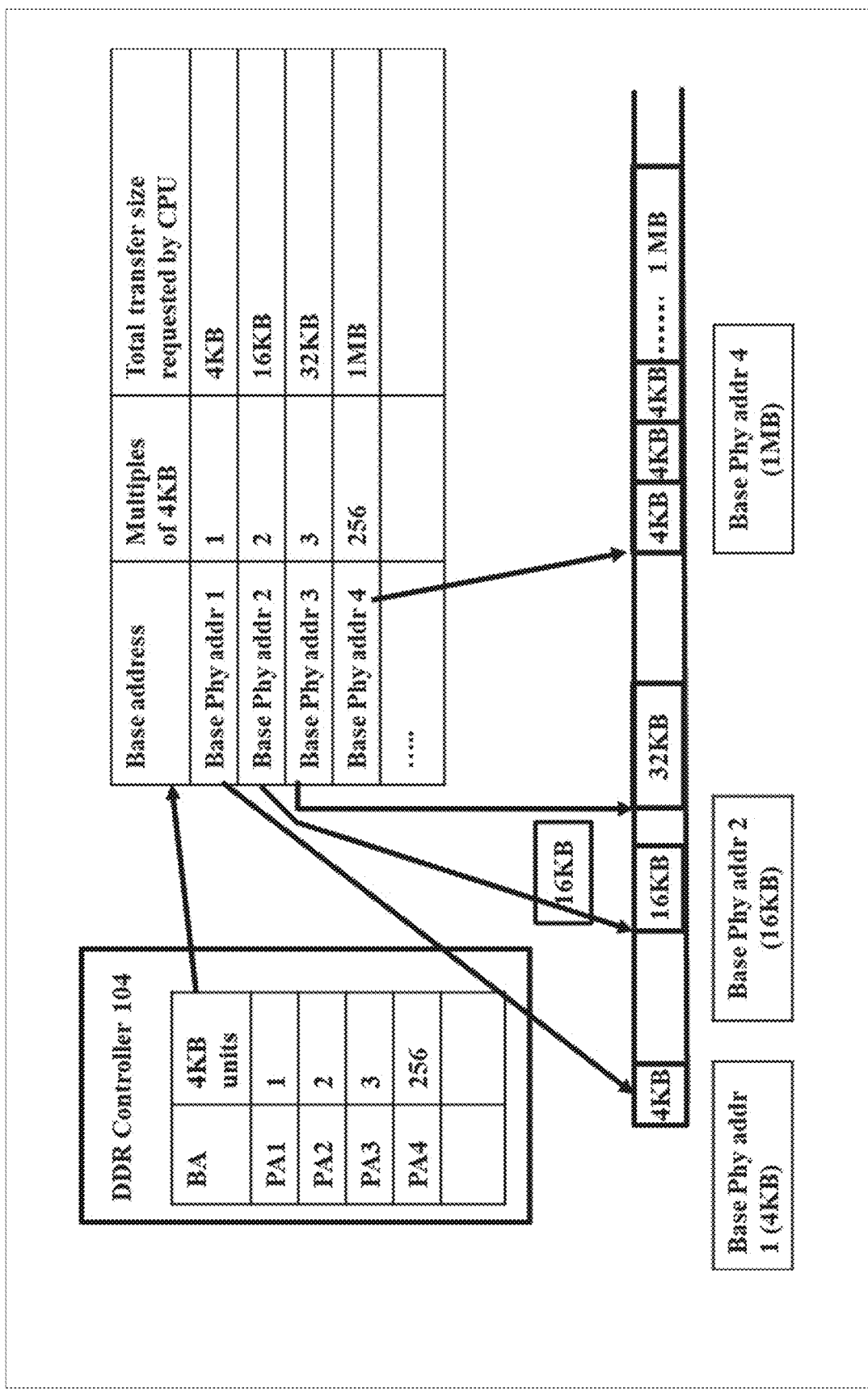
FIG. 5 depicts a process to reduce the DDR controller register write overhead via an Advanced Peripheral Bus (APB) interface, according to some example embodiments as disclosed herein.

FIG. 5 depicts a process to reduce the DDR controller 104 register write overhead via an Advanced Peripheral Bus (APB) interface. In this method, the DDR controller 104 is exports register list over APB interface and provides a list of base address (BA). For example, physical address (PA), requiring or using asynchronous access and size provided is multiple units of 4 KB. For example, a minimum or smaller size required or used for the asynchronous access is 4 KB. The required or used units of 4 KB can be mentioned against each base address. For example, for a base physical address (Base Phy addr) 3, 3 units of 4 KB is required or used and the address mentioned is the $1^{st}$ 4 KB base address. A base physical address 4 is the base address of 1 MB of memory location which is contiguous units of 256×4 KB units. Thus, with one register write, transfer for multiple units of contiguous 4 KB can be requested.

Figure 6:
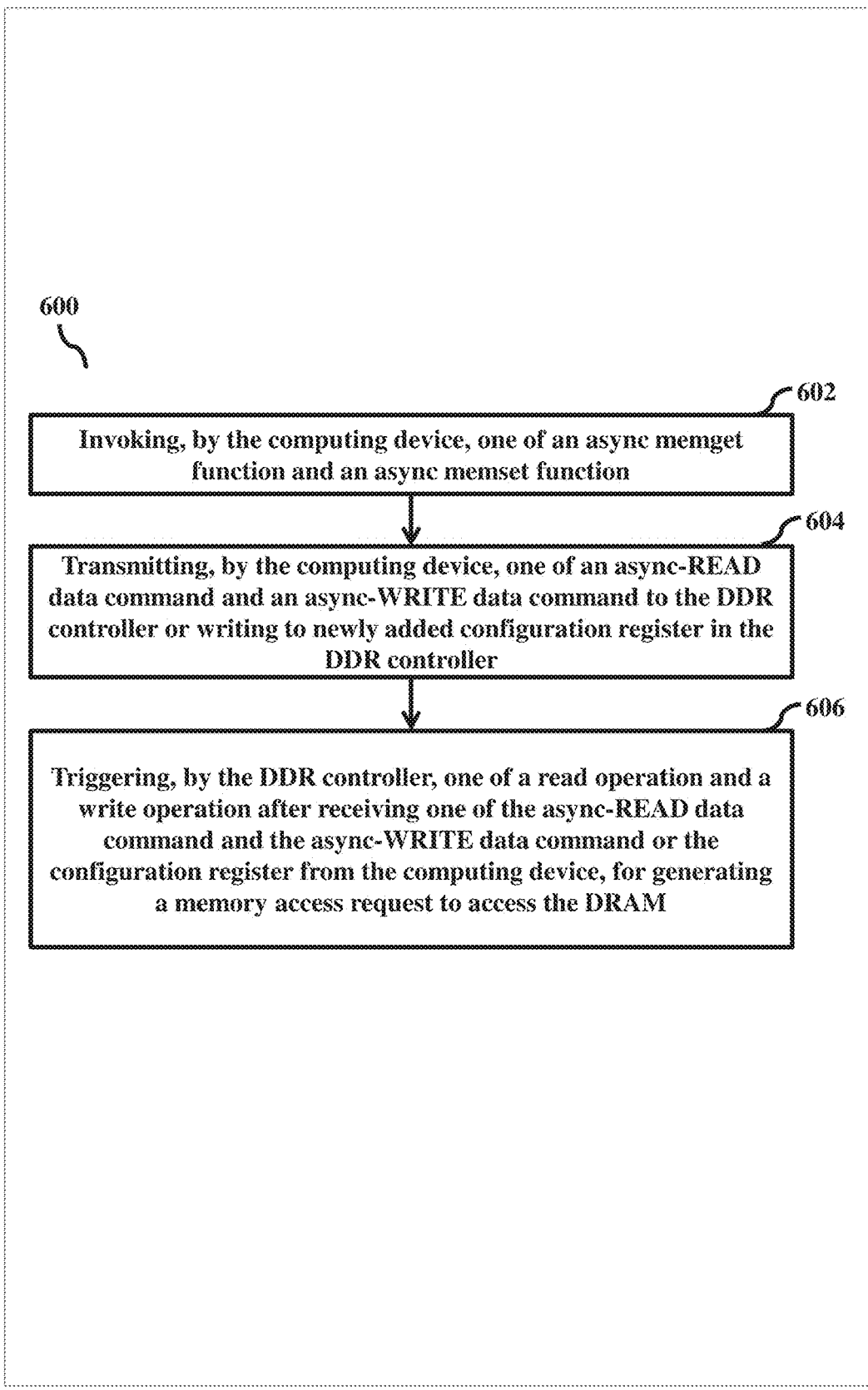
FIG. 6 depicts a method for supporting asynchronous READ/WRITE operations in the DDR controller, according to some example embodiments as disclosed herein.

FIG. 6 depicts a method 600 for supporting asynchronous READ/WRITE operations in the DDR controller 104. The method 600 discloses invoking, by the processor 108 of the computing device 102, one of an async memget function for performing an asynchronous READ operation and an async memset function for performing an asynchronous WRITE operation, as depicted in step 602. The async memget function or the async memset function can be invoked along with a specific physical address based on at least one request received from at least one API of the computing device 102. For example, if the processor 108 receives a request for a READ operation data of which may be needed in future by the computing device, then the processor 108 invokes the async memget function for implementing the asynchronous READ operation. For example, if the processor 108 receives a request for a WRITE operation, then the processor 108 invokes the async memset function for implementing the asynchronous WRITE operation. The processor 108 can further invoke the async memset function for implementing the asynchronous COPY operation which is a combination of the asynchronous READ operation and the asynchronous WRITE operation.

The method 600 discloses transmitting, by the processor 108, one of an async-READ data command and an async-WRITE data command to the DDR controller 104 or writing to newly added configuration register in the DDR controller 104 for the invoked async memget function and the async memset function, as depicted in step 604. The computing device 102 proceeds with other operations in an unblocked independent manner after transmitting the data commands or writing to the configuration registers in the DDR controller 104 for implementing one of the async memget function and the async memset function respectively. Thereafter, the method 600 discloses triggering, by the DDR controller 104, one of a read operation and a write operation after receiving one of the async-READ data command and the async-WRITE data command or writing to configuration register in the computing device 102, as depicted in step 606, thereby generating a memory access request to access the DRAM 106. The DDR controller 104 can trigger one of the read operation and the write operation for performing at least one of the asynchronous READ operation, the asynchronous WRITE operation and the asynchronous COPY operation respectively.

The various actions in method 600 may be performed in the order presented, in a different order or simultaneously. Further, in some example embodiments, some actions listed in FIG. 6 may be omitted.

Figure 7:
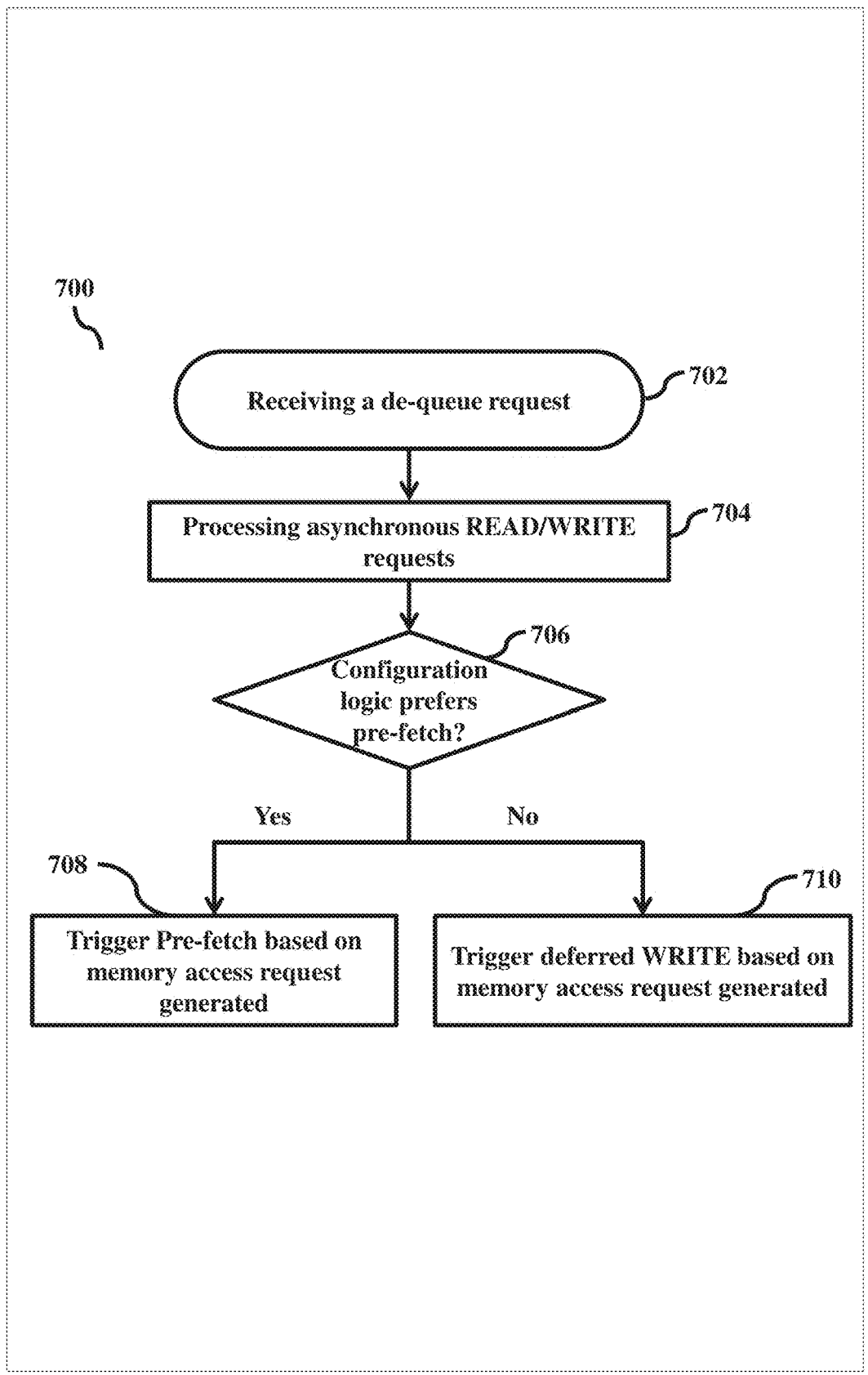
FIG. 7 depicts a DDR internal logic flow method, according to some example embodiments as disclosed herein.

FIG. 7 depicts a DDR internal logic flow method 700. As depicted in step 702, the method 700 includes receiving a de-queue request by the DDR controller 104. The method 700 includes processing asynchronous READ/WRITE requests by the DDR controller 104, as depicted in step 704, based on the received request. Thereafter, the method 700 includes verifying whether the configuration logic in the DDR controller 104 prefers pre-fetching data, as depicted in step 706, based on the processed requests.

If the configuration logic prefers pre-fetching data, then the pre-fetching is triggered based on the memory access request generated by the DDR controller 104, as depicted in step 708, for performing asynchronous READ operation. If the configuration logic does not want to pre-fetch data, then the deferred WRITE is triggered based on the memory access request generated by the DDR controller 104, as depicted in step 710, for performing asynchronous WRITE operation.

The various actions in method 700 may be performed in the order presented, in a different order or simultaneously. Further, in some example embodiments, some actions listed in FIG. 7 may be omitted.

In an example embodiment herein, if a refresh cycle is triggered by the processor 108, then the DDR controller 104 verifies whether any access request is pending for a specific bank and further refreshes the pending access request.

Figure 8:
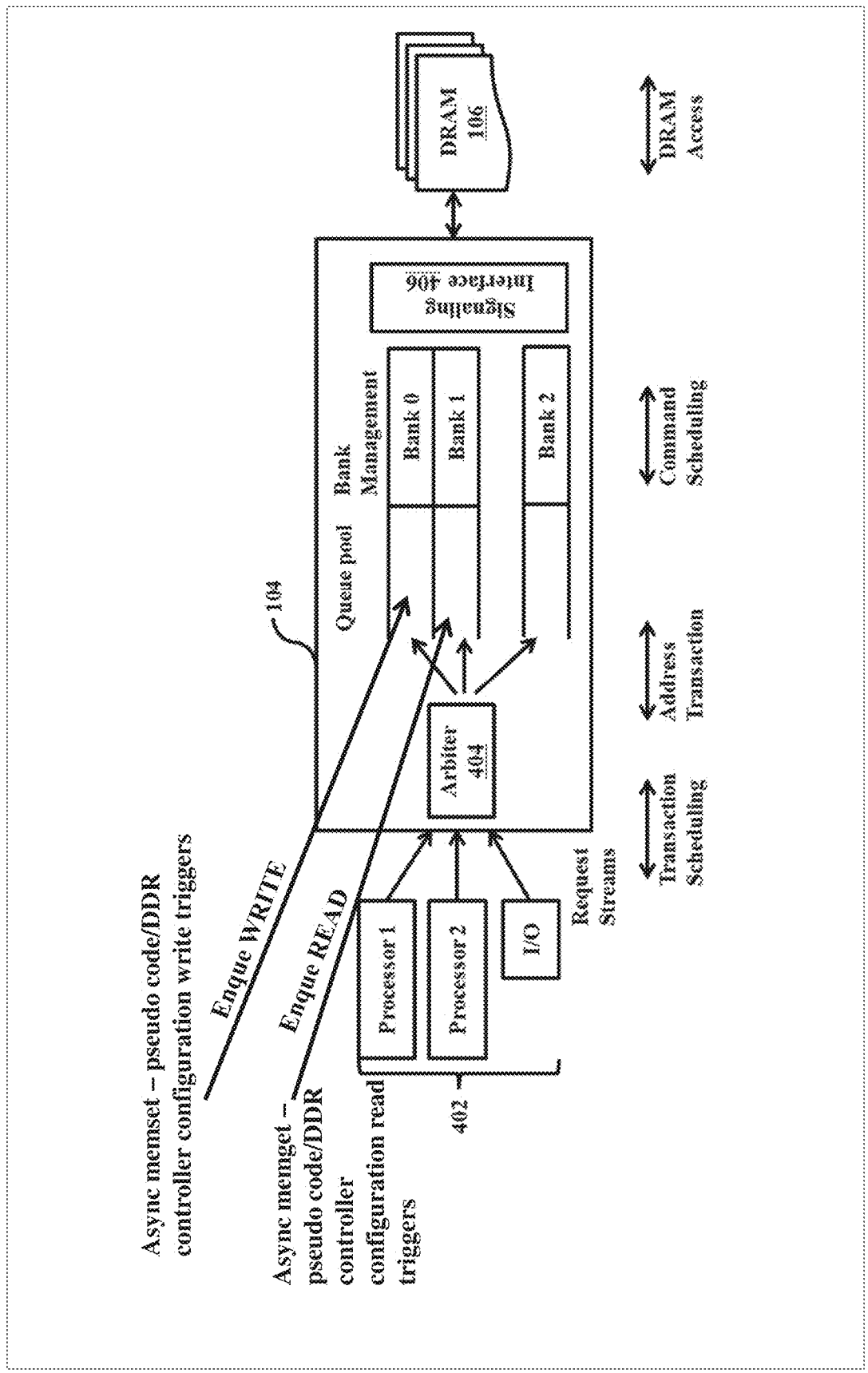
FIG. 8 depicts an en-queue of async memset and async memget pseudo-codes executed in a computing device, according to some example embodiments as disclosed herein.

FIG. 8 depicts an en-queue of async memset and async memget pseudo-code executed in the computing device.

The following example code format represents an async memset pseudo code which is executed in computing device:

```
async_memset (input parameter: virtual address ptr, size, value)
{
phys-addr = virt_to_phy(virtual address ptr)
if not present in MMU-TLB
    create TLB entry
cache invalidate (phys-addr, size)
// Below code use only phys-addr
a) vendor commands to DDR to set value (or)
b) Register write to DDR to set value
}
```

The following code format represents an async memget pseudo code which is which is executed in computing device:

```
async_memget (input parameter: virtual address ptr, size, size)
{
    phys-addr = virt_to_phy(virtual address ptr)
    if not present in MMU-TLB
        create TLB entry
    // Below code use only phys-addr
    a) vendor commands to DDR to get data (or)
    b) register write to DDR registers to trigger read data
}
```

Figure 9:
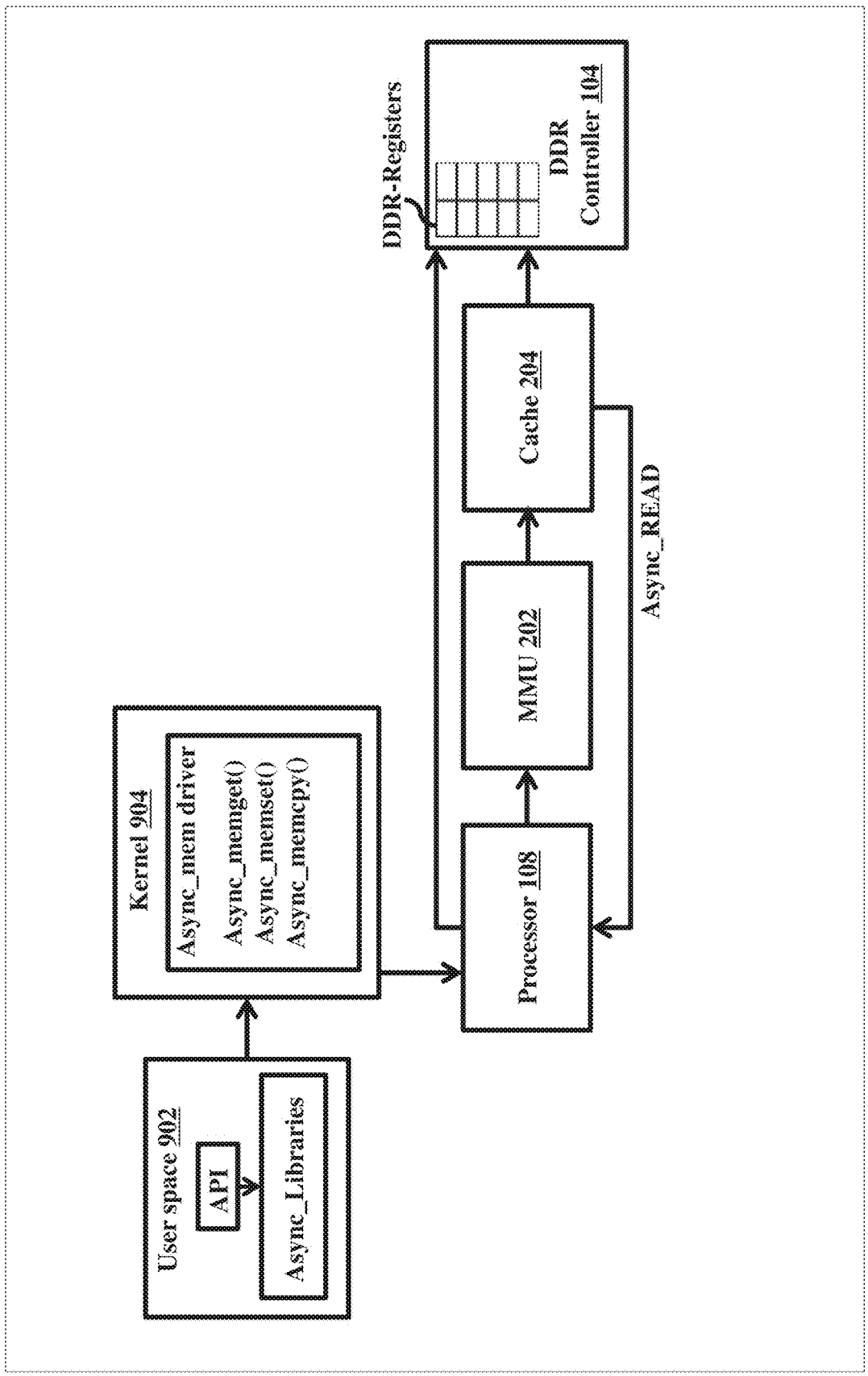
FIG. 9 depicts an async memset and async memget configuration set to the processor, according to some example embodiments as disclosed herein.

FIG. 9 depicts an async memset and async memget configuration set to the processor 108. When asynchronous READ and WRITE operations requested from APIs of a user space 902, asynchronous libraries receive requests and transmit the requests to an asynchronous memory driver of a kernel 904. The asynchronous memory driver configures the async memget and async memset requests in the processor 108, based on the requests received from the asynchronous libraries.

In an example embodiment herein, the async_memset( ) function will trigger to prefill the memory address indicated by virt-ptr with zero as shown in below code snippet::

```
async_memset (virt-ptr, size, 0) // async write trigger
// code immediate executes further, while DDR controller 104 is queued with his command of
WRITE
Malloc (ptr2, 4096); // do other heavy operations
// Image processing or other work
if (*virt-ptr == 0) // read will indicate correctly memory is filled with zeros {
    // this section of code will execute as memory will be prefilled with zeroes
}
```

In an example embodiment herein, for an immediate usage of memory pointer (virt-ptr), the asynchronous memory access behaves like synchronous memory access as before with no-benefit, as given below:

```
async_memset (virt-ptr, size, 0) // async write trigger
// code immediate executes further, while DDR controller 104 is queued with his command of
WRITE
if (*virt-ptr == 0) // read{
// this section of code may not execute as sufficient time not given for memory fill to happen
}
```

Figure 10:
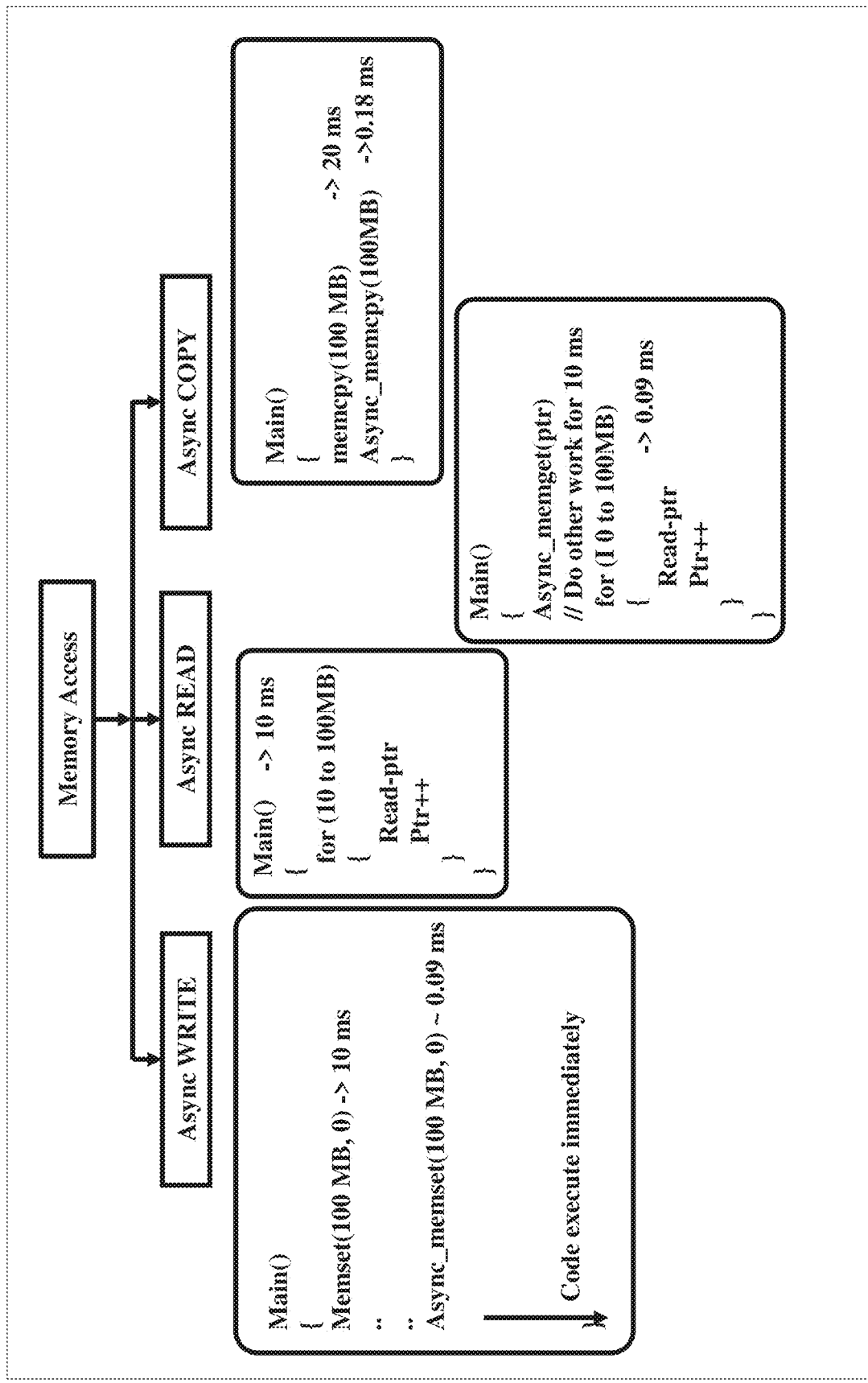
FIG. 10 depicts an example comparison of execution time for asynchronous WRITE, asynchronous READ, and asynchronous COPY operations with synchronous operations, according to some example embodiments as disclosed herein.

FIG. 10 depicts an example comparison of execution time for an asynchronous WRITE, asynchronous READ, and asynchronous COPY operations with synchronous operations. For example, a memset request of 100 MB is executed at 10 ms for synchronous WRITE operation, whereas an async memset function of 100 MB is executed at 0.09 ms for asynchronous WRITE operation. This is because Async-command is queued or programmed into DDR-controller registers; hence the delay is only for APB-register write delay. For example, a memget request of 100 MB is executed at 10 ms for synchronous READ operation, whereas an async memget function of 100 MB is executed at 0.09 ms for asynchronous READ operation. For example, a memset request of 100 MB is executed at 20 ms for asynchronous COPY operation, whereas an async memset request of 100 MB is executed at 0.18 ms for asynchronous COPY operation.

Figure 11:
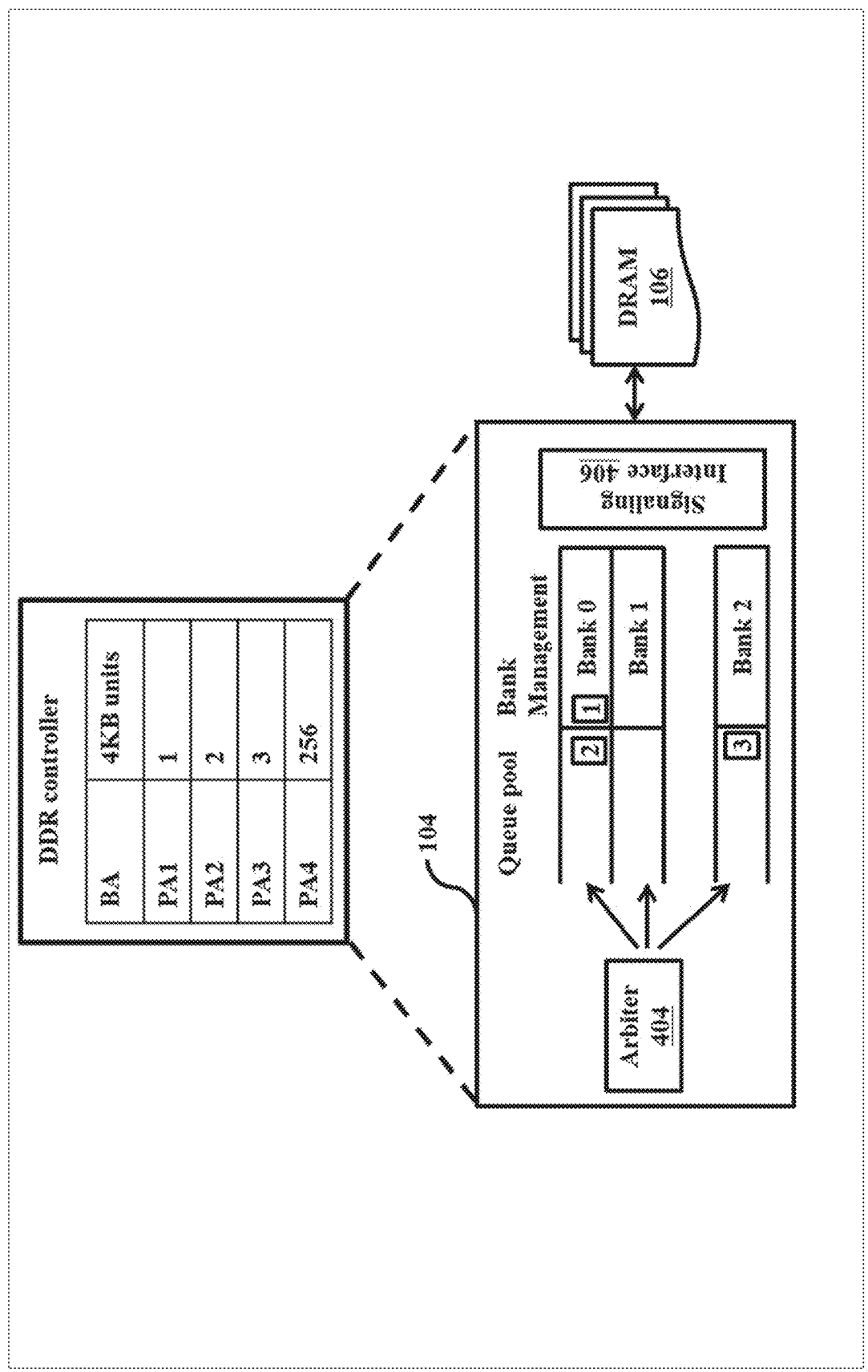
FIG. 11 depicts a DDR controller register WRITE overhead calculation, according to some example embodiments as disclosed herein.

FIG. 11 depicts a DDR controller 104 register WRITE overhead calculation. The DDR controller 104 when triggered via the DDR trigger module 116 for WRITE operation, the DDR trigger module 116 may internally request in units of 4 KB as shown in the FIG. 11. For example, for PA3, 3 units of 4 KB needs to be requested to transfer, so that the DDR controller 104 may automatically queue the request in units of 4 KB to the existing bank based queue system. For three contiguous units of 4 KB, if the last 4 KB is stored in another bank, a DDR address translation mapping mechanism may automatically take care and queue the request to respective bank and is beyond the scope of the processor 108. The processor's responsibility is to provide only a physical address to the DDR controller 104, and the DDR's responsibility is to convert the physical address in to bank-region, bank, RAS based on row bits and CAS based on Column bits, and issue request to the DDR chip. The processor 108 to the DDR controller 104 register write is over APB interface.

In an example embodiment herein, table 2 provides a custom library for image processing or deep learning usage.

TABLE 2

| Asynchronous memory access APIs | |
| --- | --- |
| async_memset (ptr, value, length) | If value is another memory address pointer, then it becomes asynchronous copy from one location to another |

TABLE 2-continued

Asynchronous memory access APIs

| | |
|---|---|
| async_memget (ptr, length) | Pointer and length of 4 KB, 8 KB is pre-fetched |
| async_memcheck(ptr, &status) | Status = 1 means completed, Status = 0 yet to complete |

The custom libraries can be linked incrementally with vision/image processing and deep learning libraries for getting better performance.

The proposed system 100 helps in multiple ways to achieve Key Performance Indicators (KPIs) such as,
 a. reducing cache misses on stereoscopic images, I cache for instruction fetching or page fault D-cache during processor 108 accesses,
 b. better memory pre-fetch efficiency with variable head pose-distortion parameters during creation of the intermediate frames,
 c. low latency implementation on the processor 108 further improves frame rate.

The proposed system 100 can be applied to all DDR controllers used in smartphone, smart television, Advanced Driver Assistance Systems (ADAS) etc. The system 100 especially helps in achieving KPIs for low-latency, low power use-cases in Augmented Reality (AR)/Virtual Reality (VR) headsets where the overall power budget restricts the GPU usage. The system 100 provides a configurable/controllable interface to the DDR controller 104 for pre-fetching the data from a memory address of interest which can be brought into cache 204. This totally zeroes out memory access latency including pre-charge, and row-access latency thus serving as an asynchronous READ operation. Further, the asynchronous WRITE involves providing buffer data (0 or fixed pattern) directly to the DDR controller 104 by the processor 108 to handle WRITE so as to avoid blocked WRITE-delays for the processor 108 and also avoid dirtying L2-cache with zeroes or any fixed pattern write scenario to memory.

The async memset use cases comprise, but not limited to, writing zeros fixed pattern, file system-pre-fill zeroes, camera and image processing libraries-pre-fill zeroes, deep learning libraries-pre-fill matrices zeroes, android Virtual Machine (VM), all applications which are linked with Exynos-Vendor provided libraries may have faster performance, and all kernel modules (memory manager which keeps pre-filled pages with Zero).

The async memget use cases comprise, but not limited to, prefetch reading data with 100% certainty of usage, random memory reads, android App launch (random file page reads), kernel system calls improved performance (madvise, fadvise), image processing algorithms—reader threads take much less CPU cycles, and deep learning in CPU itself for low-end smartphone and Internet of Things (IoT) hence enable Machine Learning (ML) on low end devices and budget phones.

Some example embodiments disclosed herein can be implemented through at least one software program running on at least one hardware device. The modules shown in FIG. 1 include blocks which can be at least one of a hardware device, or a combination of hardware device and software module.

Some example embodiments disclosed herein describes a system 100 and method 600 for implementing asynchronous READ/WRITE operations in the DDR controller 104 to reduce the DRAM access latency. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one example embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an, or at least one microprocessor and at least one memory with software modules located therein. The method example embodiments described herein could be implemented partly in hardware and partly in software. Alternatively, the invention may be implemented on different hardware devices, e.g. using a plurality of CPUs.

Any of the elements and/or functional blocks disclosed above may include or be implemented in processing circuitry such as hardware including logic circuits; a hardware/software combination such as a processor executing software; or a combination thereof. For example, the DDR controller 104, MMU 202, and arbiter 404 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

The foregoing description of the specific example embodiments will so fully reveal the general nature of the example embodiments herein that others can, by applying current knowledge, readily modify and/or adapt for various applications such specific example embodiments without departing from the generic concepts, and, therefore, such adaptations and modifications are intended to be comprehended within the meaning and range of equivalents of the disclosed example embodiments. It is to be understood that the phraseology or terminology employed herein is for the purpose of description and not of limitation. Therefore, while the example embodiments herein have been described in terms of example embodiments and examples, those skilled in the art will recognize that the example embodiments and examples disclosed herein can be practiced with modification within the spirit and scope of the example embodiments as described herein.

We claim:

1. A method for supporting asynchronous READ/WRITE operations in a Double Data Rate (DDR) controller, comprising:

invoking, by a computing device, one of an async memget function for performing an asynchronous READ operation and an async memset function for performing an asynchronous WRITE operation;

transmitting, by the computing device, one of an async-READ data command and an async-WRITE data command for the invoked async memget function and the invoked async memset function to the DDR controller, respectively, wherein the computing device proceeds with other operations in an unblocked independent manner after transmitting one of the async-READ data command and the async-WRITE data command to the DDR controller for implementing one of the async memget function and the async memset function respectively; and triggering, by the DDR controller, one of a read operation and a write operation after receiving one of the async-READ data command and the async-WRITE data command from the computing device, the one of the read operation and the write operation being for generating a memory access request to access a Dynamic Random Access Memory (DRAM).

2. The method of claim 1, wherein the method further comprises:

writing, by the computing device, to a configuration register in the DDR controller for the invoked async memget function and the invoked async memset function, wherein the computing device proceeds with the other operations in the unblocked independent manner after writing to the configuration register in the DDR controller, the other operations being for implementing one of the async memget function and the async memset function; and triggering, by the DDR controller, one of the read operation and the write operation after writing to the configuration register in the DDR controller by the computing device, the one of the read operation and the write operation being for generating the memory access request to access the DRAM.

3. The method of claim 2, wherein the async memget function issues the async-READ data command to the DDR controller or writes to the configuration register in the DDR controller, the async-READ data command being for obtaining data from a specified memory location and size.

4. The method of claim 2, wherein the async memset function issues the async-WRITE data command to the DDR controller or writes to the configuration register in the DDR controller for writing data of a specific pattern in a specified memory location and size, and wherein the configuration register specifies a specific address to READ the data so that the DDR controller reads from the specified address and WRITE to at least one destination address mentioned as part of the configuration register in the DDR controller.

5. The method of claim 2, wherein the async memset function with a memory address is programmed to the configuration register in the DDR controller for implementing an asynchronous copy operation which is a combination of the asynchronous READ operation and the asynchronous WRITE operation.

6. The method of claim 2, wherein the configuration register is configured, by the async memget function and the async memset function, with at least one of a list of physical address such as a memory location, size in units such as pre-configurable bulk data size, a WRITE pattern or a READ address of a memory location, and a plurality of status flags, the async memget function and the async memset function being for generating the memory access request.

7. The method of claim 1, wherein DDR controller is configured to place the generated memory access request in a queue in the end or head of list and/or sorted in bank wise access, the generated memory access request being for accessing the DRAM to maintain integrity of data in the DRAM.

8. A system for supporting asynchronous READ/WRITE operations in a Double Data Rate (DDR) controller, comprising:

a READ module of a computing device configured to invoke an async memget function and transmit an async-READ data command for the invoked async memget function to the DDR controller for performing an asynchronous READ operation;

a WRITE module of the computing device configured to invoke an async memset function and transmit an async-WRITE data command for the invoked async memset function to the DDR controller, the async memset function being for performing an asynchronous WRITE operation, wherein the computing device proceeds with other operations in an unblocked independent manner after transmitting one of the async-READ data command and the async-WRITE data command to the DDR controller, the one of the async-READ data command and the async-WRITE data command being for implementing one of the async memget function and the async memset function respectively; and a DDR trigger module of the DDR controller configured to trigger one of a read operation and a write operation after receiving one of the async-READ data command and the async-WRITE data command from the READ module and the WRITE module of the computing device, the read operation and the write operation being for generating a memory access request to access a Dynamic Random Access Memory (DRAM).

9. The system of claim 8, wherein the system further comprises:

the READ module of the computing device configured to invoke the async memget function and write to a configuration register in the DDR controller for the invoked async memget function for performing the asynchronous READ operation;

the WRITE module of the computing device configured to invoke the async memset function and write to the configuration register in the DDR controller for the invoked async memset function for performing the asynchronous WRITE operation, wherein the computing device proceeds with the other operations in the unblocked independent manner after writing to the configuration register in the DDR controller, the other operations being for implementing one of the async memget function and the async memset function; and the DDR trigger module of the DDR controller configured to trigger one of the read operation or the write operation after writing to the configuration register in the DDR controller by the READ module or the WRITE module of the computing device, the read operation or the write operation being for generating the memory access request to access the DRAM.

10. The system of claim 9, wherein the async memget function issues the async-READ data command to the DDR controller or writes to the configuration register in the DDR controller, the async-READ data command being for obtaining data from a specified memory location and size.

11. The system of claim 9, wherein the async memset function issues an async-WRITE data command to the DDR controller or writes to the configuration register in the DDR controller for writing data of a specific pattern in a specified memory location and size, and wherein the configuration register specifies a specific address to READ the data so that the DDR controller reads from the specified address and WRITE to destination address mentioned as part of the configuration register in the DDR controller.

12. The system of claim 9, wherein the async memset function with a memory address is programmed to the configuration register in the DDR controller for implementing an asynchronous copy operation which is a combination of the asynchronous READ operation and the asynchronous WRITE operation.

13. The system of claim 9, wherein the configuration register is configured, by the async memget function and the async memset function, with at least one of a list of physical address such as a memory location, size in units such as pre-configurable bulk data size, a WRITE pattern or a READ address of a memory location, and a plurality of status flags, for generating the memory access request.

14. The system of claim 8, wherein the generated memory access request is placed in a queue in the end or head of list and/or sorted in bank wise access, by the DDR controller, for accessing the DRAM to maintain integrity of data in the DRAM.

15. The system of claim 8, wherein the system is implemented in a processor of the computing device for implementing the asynchronous READ operation and the asynchronous WRITE operation in the DDR controller.

16. A computing device, comprising:
a processor, configured to:
invoke one of an async memget function for performing an asynchronous READ operation and an async memset function for performing an asynchronous WRITE operation; and
transmit one of an async-READ data command and an async-WRITE data command for the invoked async memget function and the invoked async memset function to a Double Data Rate (DDR) controller respectively,
wherein the processor proceeds with other operations in an unblocked independent manner after transmitting one of the async-READ data command and the async-WRITE data command to the DDR controller for implementing one of the async memget function and the async memset function respectively, and
wherein the DDR controller triggers one of a read operation and a write operation after receiving one of the async-READ data command and the async-WRITE data command from the processor, the one of the read operation and the write operation being for generating a memory access request to access a Dynamic Random Access Memory (DRAM).

17. The computing device of claim 16, wherein the processor is configured to:
invoke one of the async memget function for performing the asynchronous READ operation and the async memset function for performing the asynchronous WRITE operation; and
write to a configuration register in the DDR controller for the invoked async memget function and the invoked async memset function,
wherein the processor proceeds with the other operations in the unblocked independent manner after writing to the configuration register in the DDR controller for implementing one of the async memget function and the async memset function respectively, and
wherein the DDR controller triggers one of the read operation or the write operation after writing to the configuration register in the DDR controller by the processor, the read operation or the write operation being for generating the memory access request to access the DRAM.

* * * * *